United States Patent
De Lara Guarch et al.

(10) Patent No.: US 12,537,666 B2
(45) Date of Patent: Jan. 27, 2026

(54) EFFICIENT IMPLEMENTATION OF ZUC AUTHENTICATION

(71) Applicant: Intel Corporation, Santa Clara, CA (US)

(72) Inventors: Pablo De Lara Guarch, Shannon (IE); Tomasz Kantecki, Ennis (IE); Krystian Matusiewicz, Gdansk (PL); Wajdi Feghali, Boston, MA (US); Vinodh Gopal, Westborough, MA (US); James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 18/129,814

(22) Filed: Mar. 31, 2023

(65) Prior Publication Data

US 2024/0113863 A1   Apr. 4, 2024

Related U.S. Application Data

(60) Provisional application No. 63/412,328, filed on Sep. 30, 2022.

(51) Int. Cl.
*H04L 9/06*   (2006.01)
*H04L 9/32*   (2006.01)
*H04W 12/037*   (2021.01)

(52) U.S. Cl.
CPC ............ *H04L 9/065* (2013.01); *H04L 9/3215* (2013.01); *H04W 12/037* (2021.01)

(58) Field of Classification Search
CPC ... H04L 9/065; H04L 9/3215; H04L 2209/12; H04L 9/3242; H04W 12/037
See application file for complete search history.

(56) References Cited

U.S. PATENT DOCUMENTS

| | | | | |
|---|---|---|---|---|
| 2007/0106896 A1* | 5/2007 | Sandberg | ............. | H04L 9/0643 713/170 |
| 2008/0240423 A1* | 10/2008 | Gueron | ................. | H04L 9/3242 380/28 |
| 2012/0076293 A1* | 3/2012 | Smith | ................... | H04L 9/0656 380/28 |
| 2013/0108039 A1* | 5/2013 | Gong | .................... | H04L 9/0662 380/28 |
| 2014/0237237 A1* | 8/2014 | Brumley | ............. | H04W 12/106 713/168 |

(Continued)

OTHER PUBLICATIONS

Wei et al., "Software Implementation and Comparison of ZUC-256, SNOW-V, and AES-256 on RISC-V Platform", Mar. 2021, IEEE International Conference on Information Communication and Software Engineering, pp. 56-60 (Year: 2021).*

(Continued)

*Primary Examiner* — Kenneth W Chang
(74) *Attorney, Agent, or Firm* — Hanley, Flight & Zimmerman, LLC

(57) ABSTRACT

Methods and apparatus relating to an efficient implementation of ZUC authentication are described. In one embodiment, a processor computes a tag update, based at least in part on stored data, for an authentication operation. The tag update is computed by replacing a 'for' loop with a carryless multiply operation. Other embodiments are also claimed and disclosed.

17 Claims, 8 Drawing Sheets

(56) References Cited

U.S. PATENT DOCUMENTS

2017/0366355 A1* 12/2017 Alomair ................ H04L 9/0643
2019/0132118 A1* 5/2019 Ghosh .................... H04L 9/321

OTHER PUBLICATIONS

The GmSSL Project, downloaded Jan. 9, 2023, from gmssl.org, 5 pages.
VNF—Vitual Network Functions, 2022, 4 pages.
ZUC stream cipher, downloaded from http://en/wikipedia.org on Jan. 9, 2023, 1 page.

* cited by examiner

From ZUC spec, previous slide, one can define Tag_Update value as follows (+ is xor and · is multiply):

202  Tag_Update[0] := W[0]·M[0] + W[1]·M[1] + W[2]·M[2] + ... + W[31]·M[31]
204  Tag_Update[1] := W[1]·M[0] + W[2]·M[1] + W[3]·M[2] + ... + W[32]·M[31]
206  Tag_Update[2] := W[2]·M[0] + W[3]·M[1] + W[4]·M[2] + ... + W[33]·M[31]
     ...
208  Tag_Update[31] := W[31]·M[0] + W[32]·M[1] + W[33]·M[2] + ... + W[62]·M[31]

450

Tag_Update for system 400 can be defined as follows (+ is xor and · is multiply):

452  Tag_Update[0] := w[0]·m[0] + w[1]·m[1] + w[2]·m[2] + w[3]·m[3]

454  Tag_Update[1] := w[1]·m[0] + w[2]·m[1] + w[3]·m[2] + w[4]·m[3]

456  Tag_Update[2] := w[2]·m[0] + w[3]·m[1] + w[4]·m[2] + w[5]·m[3]

458  Tag_Update[3] := w[3]·m[0] + w[4]·m[1] + w[5]·m[2] + w[6]·m[3]

EFFICIENT IMPLEMENTATION OF ZUC AUTHENTICATION

RELATED APPLICATIONS

The present disclosure is a non-provisional of and claims priority from U.S. Provisional Patent Application, Ser. No. 63/412,328, filed Sep. 30, 2022, entitled "EFFICIENT IMPLEMENTATION OF ZUC AUTHENTICATION (EIA3)" which is hereby incorporated herein in its entirety and for all purposes.

FIELD

The present disclosure generally relates to the field of electronics. More particularly, an embodiment relates to an efficient implementation of ZUC authentication.

BACKGROUND

The ZUC cipher and authentication have been part of the 3GPP standard for Radio Access Network (RAN) for 3G, 4G, and 5G. It is named after Zu Chongzhi, the fifth-century Chinese mathematician. Moreover, the higher throughputs driven by 3GPP standards, and the industry move to Virtual Network Features (VNFs) and cloud-based deployments push for both efficient and secure software solutions, which can be a hard combination to achieve.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figures 1, 2:
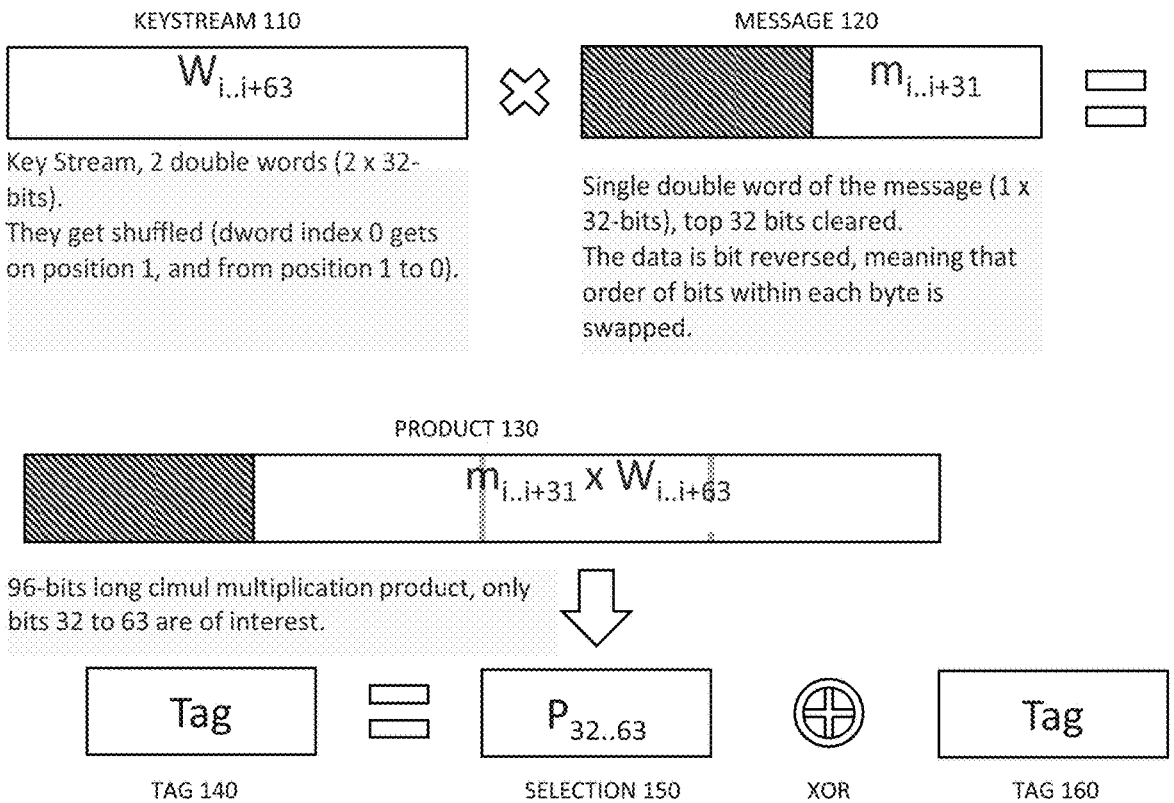
FIG. 1 illustrates a computation of the digest for 32 bits of data with a single PCLMULQDQ instruction, according to an embodiment.
FIG. 2 illustrates sequences of computations, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, the ZUC cipher and authentication have been part of the 3GPP standard for Radio Access Network (RAN) for 3G, 4G, and 5G. The higher throughputs driven by 3GPP standards, and the industry move to virtual network features (VNFs) and cloud-based deployments push for both efficient and secure software solutions, which can be a hard combination to achieve.

To this end, some embodiments relate to an efficient implementation of ZUC Authentication. In one embodiment, a processor computes a tag update, based at least in part on stored data, for an authentication operation. The tag update is computed by replacing a 'for' loop with a carry-less multiply operation.

In an embodiment, a processor computes the authentication tag based on one or more selected bits of a product of the carry-less multiply operation as the tag update. The processor may compute the tag update based at least in part on a 64-bit keystream and a 32-bit message for a 4-byte tag, in response to a carry-less multiply instruction that accepts 64-bit operands. The processor may compute the tag update based at least in part on a 128-bit keystream and a 64-bit message for an 8-byte tag, in response to a carry-less multiply instruction that accepts 64-bit operands.

In another embodiment, the processor computes the tag update based at least in part on a 256-bit keystream and a 128-bit message for a 16-byte tag, in response to a carry-less multiply instruction that accepts 64-bit operands. The processor may compute the tag update in response to sixteen carry-less multiply instructions with 64-bit portions of the keystream and 32-bit portions of the message.

Moreover, sometimes the ZUC authentication is offloaded to a dedicated hardware accelerator. Existing software solutions are inefficient (e.g., GmSSL). There are no known specialized processor instructions to accelerate the authentication computations. Moreover, a dedicated hardware accelerator is complicated in VNF/cloud deployments and adds to the platform Bill of Materials (BOM). Further, software implementations are rather inefficient on the digest computation, as they require bit-level loop computations.

In an embodiment, for the ZUC-EIA3 algorithm (where "EIA3" stands to Evolved Packet System (EPS) Integrity Algorithm 3), the authentication tag is computed by first generating a defined number of keystream words based on the message length (l) and the tag length (t) and then applying a series of exclusive ORs (XORs) between the keystream and the intermediate authentication tag, depending on each bit of the message, as the following algorithm describes.

In accordance with one or more embodiments, the proposed implementation provides an optimization for phases 3-5 of the Message Authentication Code (MAC) Generation algorithm of the ZUC-256 specification or section 4.5 of the ZUC-128 specification. The optimization can replace the 'for' loop with PCLMULQDQ instructions where 32 bits of data 'm' are multiplied against 64 bits of keystream 'W'. The PCLMULQDQ instruction is a carry-less multiply. The carry-less multiply results in a carry-less product of two numbers. Conceptually, a carry-less multiply works like long multiplication except for discarding the carry instead of applying the carry to the more significant position. A carry-less multiply can also be referred to as an XOR multiplication, e.g., since that carry-discarding addition is equivalent to an exclusive OR.

FIG. 1 illustrates a computation 100 of the digest for 32 bits of data with a single PCLMULQDQ instruction, according to an embodiment. Computation 100 can be performed for an authentication operation. Keystream 110 represents a double word key stream, having 2×32 bits. Keystream 110 is illustrated as Wi . . . i+63, representing the 64 bits of W starting at Wi. Message 120 represents a single word of the message, having 1×32 bits. Message 120 is illustrated as mi . . . i+31, representing the 32 bits starting at mi.

When keystream 110 is multiplied by message 120, the message can be converted to a double word, leaving the upper 32 bits cleared. In one example, the data in message 120 is bit-reversed, where the order bits within each byte is swapped.

The multiplication of keystream 110 and message 120 results in product 130, which will have 96 bits. Tag 140 represents the new or updated tag for the algorithm. Tag 140 represents the XOR of selection 150 with tag 160. Tag 160 represents the prior version of the tag. Selection 150 is the tag update, used to generate the new tag. Selection 150 represents the bits of interest of product 130.

FIG. 2 illustrates sequences of computations 200, according to an embodiment. Computations 200 illustrate why selection 150 of computation 100 is the only part of the product that is of interest. In the following discussion, the dot operator represents multiplication of the bits, and the plus operator '+' represents an XOR of the products.

Row 202 illustrates Tag_Update[0], which is computed as W[0]·M[0]+W[1]·M[1]+ . . . +W[31]·M[31], which is the first 32 bits of the keystream multiplied with the 32 bits of the message, respectively. The products of each of the bit positions are all XORed together for the tag update.

Row 204 illustrates Tag_Update[1], which is the same as Tag_Update[0], with the keystream shifted left one bit. Thus, Tag_Update[1] is computed as W[1]·M[0]+W[2]·M[1]+ . . . +W[32]·M[31]. Row 206 illustrates Tag_Update[2], which has the keystream shifted one more bit to the left, resulting in W[2]·M[0]+W[3]·M[1]+ . . . +W[33]·M[31]. The sequence continues to row 208, which illustrates Tag_Update[31] computed as W[31]·M[0]+W[32]·M[1]+ . . . +W[62]·M[31].

As described in more detail below, the computations for the tag updates may be provided by only selected bits of the product. Based on the definition of the PCLMULQDQ instruction, bits range 32 to 63 (62) of the product satisfies the tag update definitions. Bits 0 to 30 and bits 64 to 95 of the product do not take all required input values for the ZUC update computation. Thus, the middle portion of the bits has all necessary computations for all bits to be considered.

Because of what is shown in computations 200, for 4-byte authentication tags (in ZUC-128 or ZUC-256), a single PCLMULQDQ instruction is able to compute the same data as 32 iterations of the 'for' loop. Bits 32 to 63 of the 128-bit multiplication result are XORed with the previous tag. This process is done in steps of 32 bits, until all data is digested.

Figure 3:
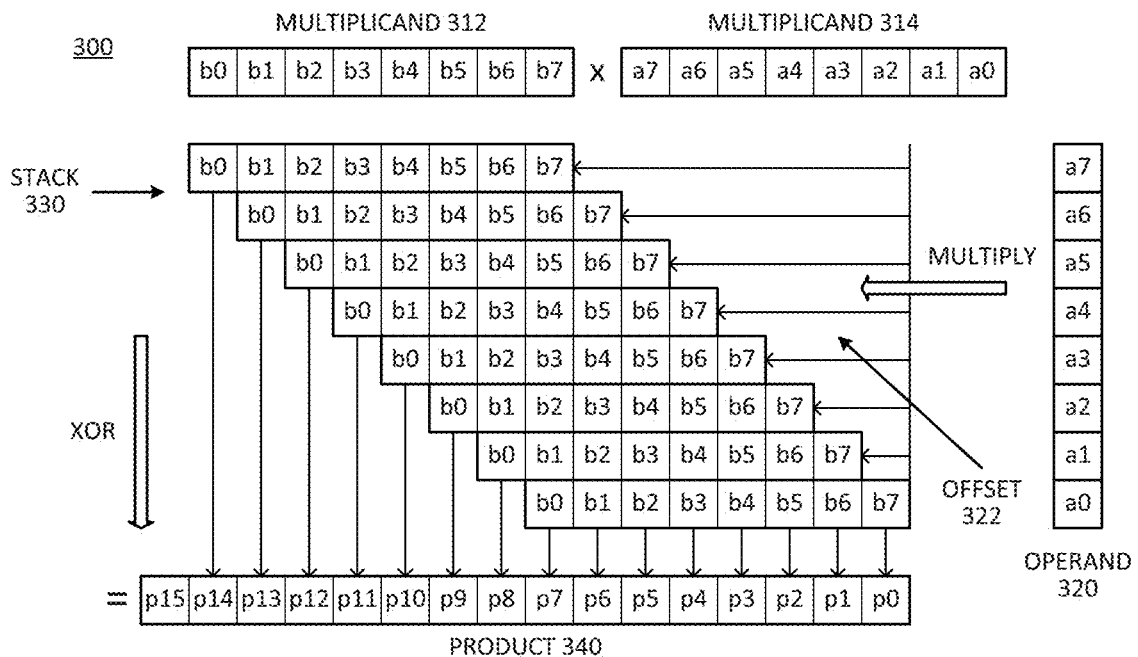
FIG. 3 illustrates the basics of the carry-less multiple operation, illustrating the principles of operation with 8-bit operands, according to an embodiment.

FIG. 3 illustrates the basics of the carry-less multiply operation, illustrating the principles of operation with 8-bit operands, according to an embodiment. Computation 300 has multiplicand 312 ([b0:b7]) and multiplicand 314 ([a7:a0]). As can be observed, the order of the bits of multiplicand 312 is reversed as compared to multiplicand 314, consistent with the computation illustrated in computation 100.

Multiplicand 314 is illustrated as operand 320, with the bits vertical, consistent with stack 330, which represents the operation of the carry-less multiply. Stack 330 has multiplicand 312 repeated eight times (the size of multiplicand 314), offset one bit to the left for each level higher in the stack. Offset 322 represents the fact that a particular row of the stack is multiplied by the bit of operand 320 corresponding to that row. The offset is to preserve the bit location of the bit of operand 320.

As shown in FIG. 3, the computation 300 performs the bit multiplies, and then XORs the results vertically to generate product 340. It may be observed that for every bit of operand 320 that is a zero, the entire corresponding row of stack 330 will also be zero. In effect, a stack showing properly offset rows for every bit position of operand 320 that has a '1' bit will produce the same result.

Further, product 340 has 15 bits ([p14:p0]) because the multiply operation is carry-less, which means there will be no carryover in the multiply to the 16th bit location (p15). Hence, in operation, product 340 will be a 16-bit value, where only 15 bits are computed.

Figure 4A:
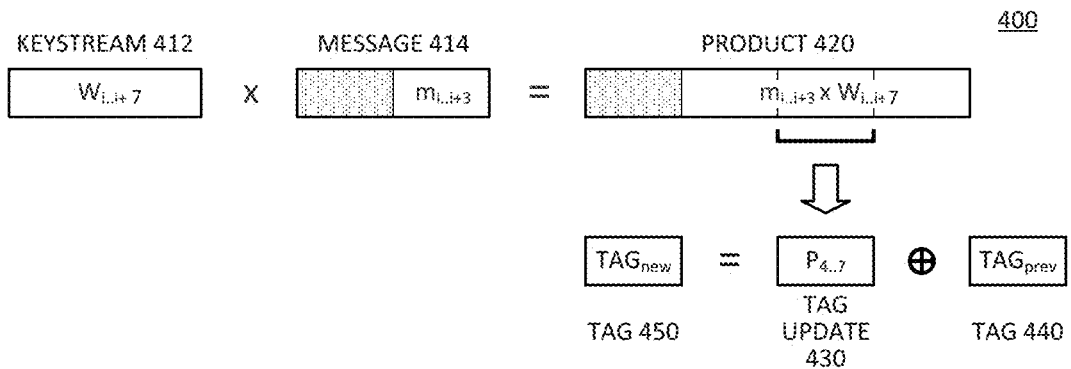
FIGS. 4A, 4B, and 5 illustrate computations, according to some embodiments.
Figures 4B, 5:
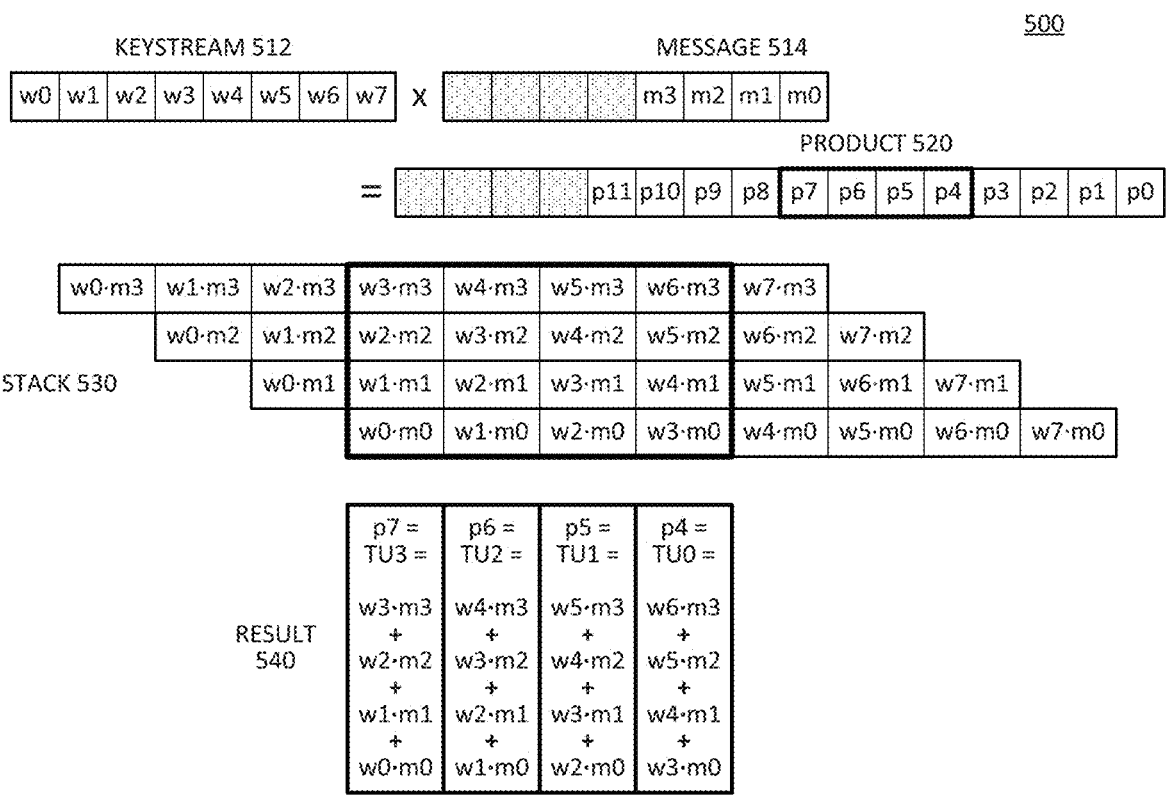

Various computations are discussed herein and it is noted that computations on smaller data sizes are not par to the ZUC standard and these computations are shown for illustrative purposes (see, e.g., FIGS. 4A, 4B, and 5).

FIG. 4A illustrates an example of computation 100 of FIG. 1, but the illustrated computation 400 has an 8-bit keystream and 4-bit message, to provide more details on selecting only certain bits of the product, according to an embodiment. Computation 400 illustrates keystream 412 (Wi . . . i+7) multiplied by message 414 (mi . . . i+3) to result in product 420 (mi . . . i+3*Wi . . . i+7). Tag 450 represents the new tag, computed as the XOR of tag 440 (the previous tag) with tag update 430 (P4 . . . 7).

FIG. 4B illustrates the tag update for the computation with an 8-bit keystream and a 4-bit message, according to an embodiment. Computation 450 represents the target tag updates for system 400, where the dot operator '·' represents multiplication of the bits, and the plus operator '+' represents an XOR of the products.

Row 452 illustrates Tag_Update[0], computed as w[0]·m[0]+w[1]·m[1]+w[2]·m[2]+w[3]·m[3]. Row 454 illustrates Tag_Update[1], computed as w[1]·m[0]+w[2]·m[1]+w[3]·m[2]+w[4]·m[3]. Row 456 illustrates Tag_Update[2], computed as w[2]·m[0]+w[3]·m[1]+w[4]·m[2]+w[5]·m[3]. Row 208 illustrates Tag_Update[3], computed as w[3]·m[0]+w[4]·m[1]+w[5]·m[2]+w[6]·m[3].

FIG. 5 illustrates computation 500, which is an application of carry-less multiply for an 8-bit multiplicand by a 4-bit multiplicand, according to an embodiment. Computation 500 illustrates keystream 512 ([w0:w7]) multiplied by message 514 ([m3:m0]) to generate product 520 (p11:p0]).

As stated above, for bits of the second multiplicand that are zero, there will be all zeros in the corresponding row of the stack. Since message 514 only has four bits, the upper four row of the stack will be all zeros. Thus, stack 530 only illustrates a stack that is four high instead of eight high.

The top row has eight bit positions, computed as the eight bits of keystream 512 times bit m3 of message 514, offset by 3. The next row has the computation of the eight bits of keystream 512 times bit m2 of message, offset by 2. The next row has the computation of the eight bits of keystream 512 times bit m1 of message, offset by 1. The bottom row has the computation of the eight bits of keystream 512 times bit m0 of message, offset by 0. Thus, the offset corresponds to the bit number of message 514.

The dark/bold box illustrates bit positions p7:p4 of the product. Result 540 shows that p7 equals the TagUpdate3 (TU3), computed as w[3]·m[0]+w[4]·m[1]+w[5]·m[2]+w[6]·m[3]. Product bit p6 equals the TagUpdate2, computed as w[2]·m[0]+w[3]·m[1]+w[4]·m[2]+w[5]·m[3]. Product bit p5 equals the TagUpdate1, computed as w[1]·m[0]+w[2]·m[1]+w[3]·m[2]+w[4]·m[3]. Product bit p4 equals the TagUpdate0, computed as w[0]·m[0]+w[1]·m[1]+w[2]·m[2]+w[3]·m[3].

It may be observed that product bits p7:p4 are the same as Tag_Update[3:0], respectively, as identified in computation 450. Thus, only bits p7:p4 would be needed for an 8-bit keystream and 4-bit message. It can also be determined in a similar fashion that bits P[63:32] are the only product bits needed for a 32-bit carry-less multiply operation on a 64-bit keystream with a 32-bit message (e.g., which would be enough for four-byte tag calculations).

For larger tag sizes (8 and 16 bytes), the process can be scaled up using more than 1 PCLMULQDQ for every 32 bits of data, in some embodiments. For 8-byte tags, the system can utilize two PCLMULQDQ instructions, one targeting the lower 32 bits of the tag, and another one targeting the higher 32 bits of the tag. For 16-byte tags, the system can utilize four PCLMULQDQ instructions, each targeting the four different 32-bit words inside the 128-bit tag, XORing the previous tag.

Figures 6A, 6B:
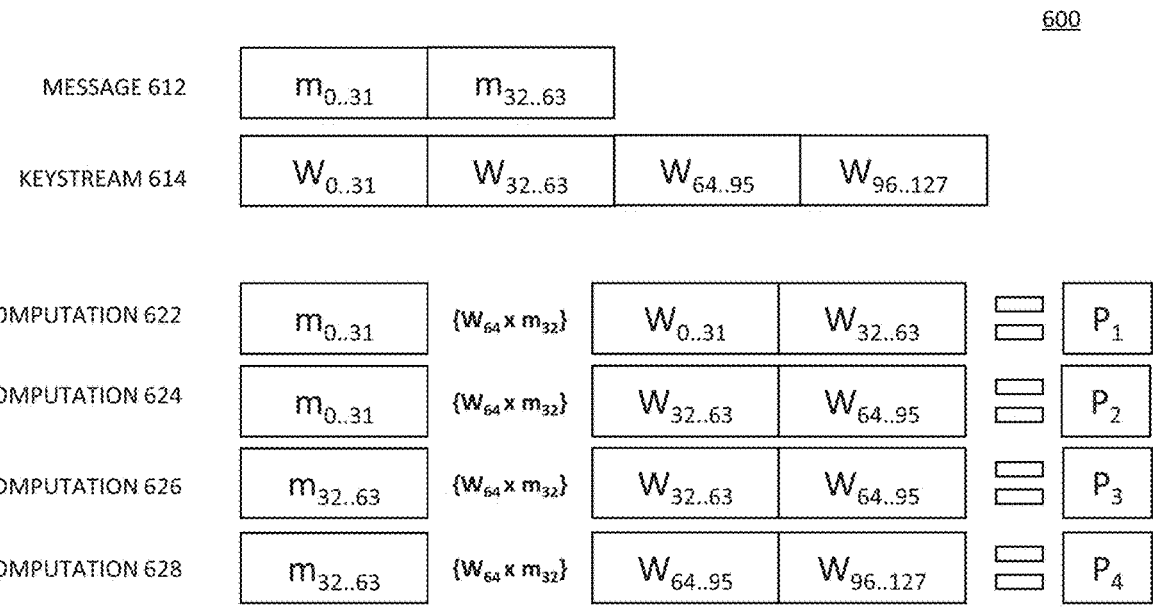
FIGS. 6A and 6B illustrate examples of tag updates for a ZUC 256 authentication with an 8-byte tag, according to an embodiment.

FIGS. 6A and 6B illustrate examples of tag updates for ZUC 256 authentication with an 8-byte tag, according to some embodiments. Referring to FIG. 6A, 64-bits of message 'm' need to get "multiplied" against 128-bits of key stream 'W'. Consider a scenario where PCLMULQDQ is only capable of computing two 64-bit values. In such a case, the PCLMULQDQ instruction can natively compute the tag updates for 64-bits of 'W' and 32-bits of 'm'.

Computation 600 illustrates splitting W and m into smaller chunks and performing 4 ZUC product operations, then combining the results together. Message 612 has 64 bits ([m63:m0]) and keystream 614 has 128 bits ([W0:W127] when the keystream is bit reversed).

Computation 622 illustrates a computation of [m31:m0] with [W0:W31] and [W32:W63] to result in P1. Computation 624 illustrates a computation of [m31:m0] with [W32:W63] and [W64:W95] to result in P2. Computation 626 illustrates a computation of [m63:m32] with [W32:W63] and [W64:W95] to result in P3. Computation 628 illustrates a computation of [m63:m32] with [W64:W95] and [W96:W127] to result in P4.

FIG. 6B illustrates tag update equations for the four products computed in computation 600. In computation 632, Tag_Update_Lo is computed as P1 XOR P3. In computation 634, Tag_Update_Hi is computed as (P2 XOR P4)<<32. The shifting left 32 bits preserves the bit positions. In computation 636, Tag-Update is computed as Tag_Update_Hi ORed with Tag_Update_Lo. The equations can be broken out as previously done to verify that the computations will generate the target results.

Computation 638 provides the final operation common to the operations above. In computation 638, the new tag is computed as the previous tag XORed with the tag update computed in computation 632, computation 634, and computation 636.

Figures 7A, 7B:
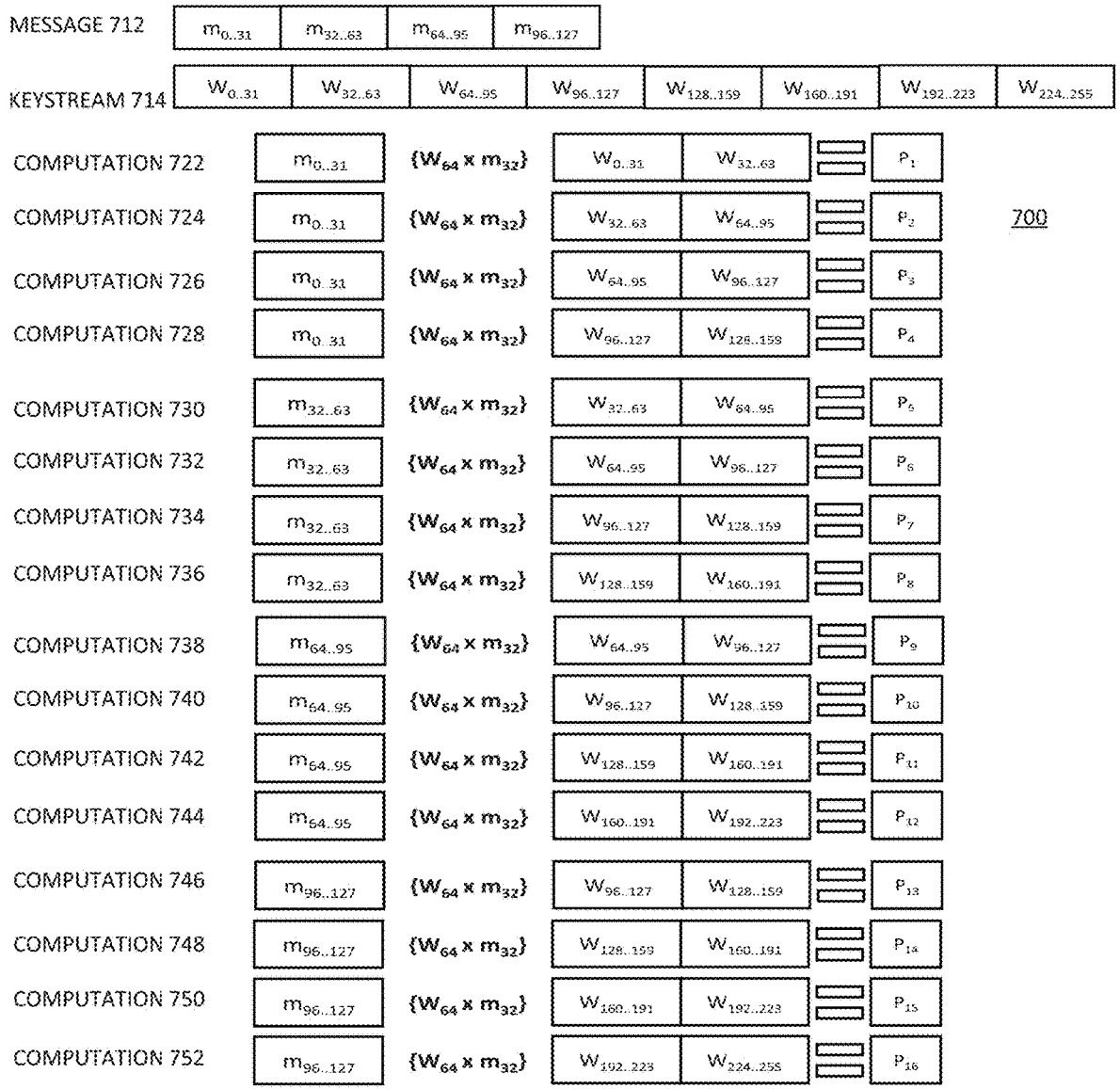
FIG. 7A illustrates computations for a ZUC 256 authentication with a 16-byte tag size, according to one embodiments.
FIG. 7B illustrates tag update equations for a ZUC 256 authentication with a 16-byte tag size, according to an embodiment.

FIG. 7A illustrates computations 700 for a ZUC 256 authentication with a 16-byte tag size, according to an embodiment. Computations 700 compute the 16-byte tag for 128 bits of data with 16 PCLMULQDQ instructions. The approach with the 16-bytes tag is similar but not identical to the one for the 8-byte tag, i.e., breaking the operands into multiple parts.

In this case, 128-bits of message 'm' is "multiplied" against 256-bits of key stream 'W'. As before, the PCLMULQDQ instruction can natively compute the tag updates for 64-bits of 'W' and 32-bits of 'm'.

Computations 700 illustrate splitting W and m into smaller chunks and performing 16 ZUC product operations, then combining the results. Message 712 has 128 bits ([m127:m0]) and keystream 714 has 256 bits ([W0:W255] when the keystream is bit reversed).

Computation 722 illustrates a computation of [m31:m0] with [W0:W31] and [W32:W63] to result in P1. Computation 724 illustrates a computation of [m31:m0] with [W32:W63] and [W64:W95] to result in P2. Computation 726 illustrates a computation of [m31:m0] with [W64:W95] and [W96:W127] to result in P3. Computation 728 illustrates a computation of [m63:m32] with [W96:W127] and [W128:W159] to result in P4.

Computation 730 illustrates a computation of [m63:m32] with [W32:W63] and [W64:W95] to result in P5. Computation 732 illustrates a computation of [m63:m32] with [W64:W95] and [W96:W127] to result in P6. Computation 734 illustrates a computation of [m63:m32] with [W96:W127] and [W128:W159] to result in P7. Computation 736 illustrates a computation of [m63:m32] with [W128:W159] and [W160:W191] to result in P8.

Computation 738 illustrates a computation of [m95:m64] with [W64:W95] and [W96:W127] to result in P9. Computation 740 illustrates a computation of [m95:m64] with [W96:W127] and [W128:W159] to result in P10. Computation 742 illustrates a computation of [m95:m64] with [W128:W159] and [W160:W191] to result in P11. Computation 744 illustrates a computation of [m95:m64] with [W160:W191] and [W192:W223] to result in P12.

Computation 746 illustrates a computation of [m127:m96] with [W96:W127] and [W128:W159] to result in P13. Computation 748 illustrates a computation of [m127:m96] with [W128:W159] and [W160:W191] to result in P14. Computation 750 illustrates a computation of [m127:m96] with [W160:W191] and [W192:W223] to result in P15. Computation 752 illustrates a computation of [m127:m96] with [W192:W223] and [W224:W256] to result in P16.

FIG. 7B illustrates tag update equations for the four products computed in computation 700, according to an embodiment. In computation 762, Tag_Update0 is computed as P1 XOR P5 XOR P9 XOR P13. In computation 764, Tag_Update1 is computed as P2 XOR P6 XOR P10 XOR P14. In computation 766, Tag_Update2 is computed as P3 XOR P7 XOR P11 XOR P15. In computation 768, Tag_Update3 is computed as P4 XOR P8 XOR P12 XOR P16. In computation 770, Tag_Update is computed as Tag_Update0 OR (Tag_Update1<<32) OR (Tag_Update2<<64) OR (Tag_Update3<<96). Again, shifting left preserves the bit positions.

Computation 772 provides the final operation common to the operations above. In computation 772, the new tag is computed as the previous tag XORed with the tag update computed in computation 762, computation 764, computation 766, computation 768, and computation 770.

In one example, a system applies a standard version of PCLMULQDQ instruction. In one example, a system applies a vectorized version of PCLMULQDQ instruction. The system may employ architectures such as processors provided by various companies, or other systems that support a carry-less multiply instruction as described.

An embodiment of the ZUC-EIA3 authentication algorithm accelerates the digest computation, by utilizing a carry-less multiply PCLMULQDQ instruction. Such an implementation may achieve approximately a 124× improvement (e.g., from 124 cycles/B on GmSSL to 1.01 cycles/B on the proposed implementation) for ZUC-128 over other software libraries, and approximately 228× for 16-byte tags on ZUC-256.

The cycle cost for both implementations, where lower is better, with ZUC-EEA3 added to show keystream generation contribution (where "EEA3" stands for EPS Encryption Algorithm 3):

IPSec MB:
  ZUC-EEA3: 3,719 (0.91 cycles/B)
  ZUC-EIA3-256 (4-byte tag): 4,138 (1.01 cycles/B)
  ZUC-EIA3-256 (8-byte tag): 4,639 (1.13 cycles/B)
  ZUC-EIA3-256 (16-byte tag): 5,883 (1.43 cycles/B)
GmSSL:
  ZUC-EEA3: 200,704 (49 cycles/B)
  ZUC-EIA3-256 (4-byte tag): 507,904 (124 cycles/B)
  ZUC-EIA3-256 (8-byte tag): 761,856 (186 cycles/B)
  ZUC-EIA3-256 (16-byte tag): 1,335,296 (326 cycles/B)

One or more embodiments can provide several advantages over hardware acceleration such as: (1) utilizing the PCLMULQDQ instruction does not require hardware acceleration, which can reduce the hardware costs, and is easy to deploy in VNF/cloud scenario (for example, the implementation may be efficient (e.g., 10 MHz sector on a single core) and easy to scale); (2) the implementation may further outperform implementations of hardware acceleration, and, such an implementation may improve throughput scalability when used on ZUC-256 compared to existing implementations, e.g., as tag size is increased (for example, by adding extra computation).

Figure 8:
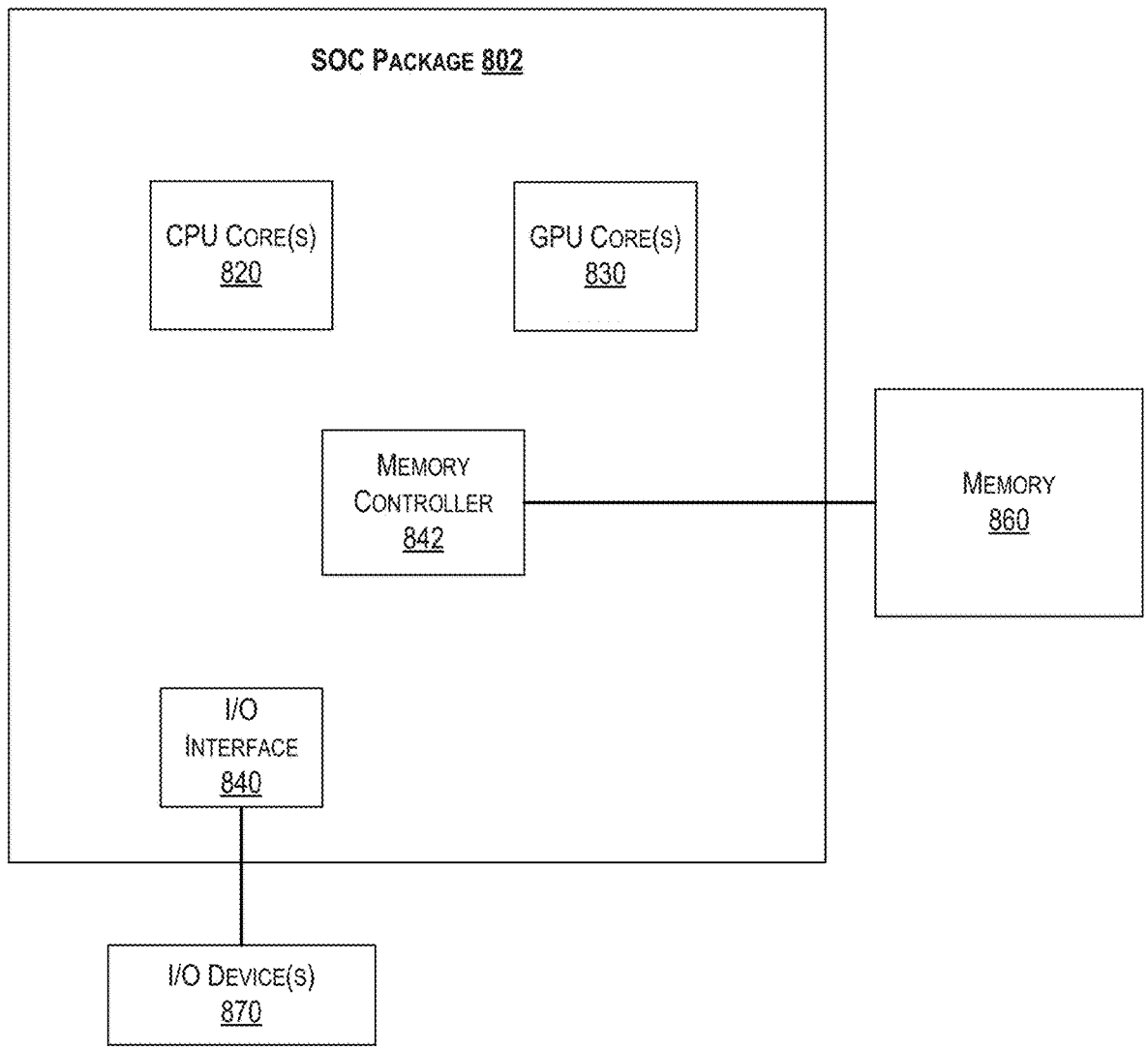
FIG. 8 illustrates a block diagram of an embodiment of a computing system, which may be utilized in various embodiments discussed herein.

One or more components discussed with reference to FIGS. 8-10 (including but not limited to I/O devices, memory/storage devices, graphics/processing cards/devices, network/bus/audio/display/graphics controllers, wireless transceivers, etc.) may apply an efficient implementation of ZUC authentication utilizing the techniques discussed above with reference to FIGS. 1-7B. More particularly, FIG. 8 illustrates a block diagram of a System on Chip ("SOC" or "SoC") package in accordance with an embodiment. As illustrated in FIG. 8, SOC 802 includes one or more Central Processing Unit (CPU) or processor cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
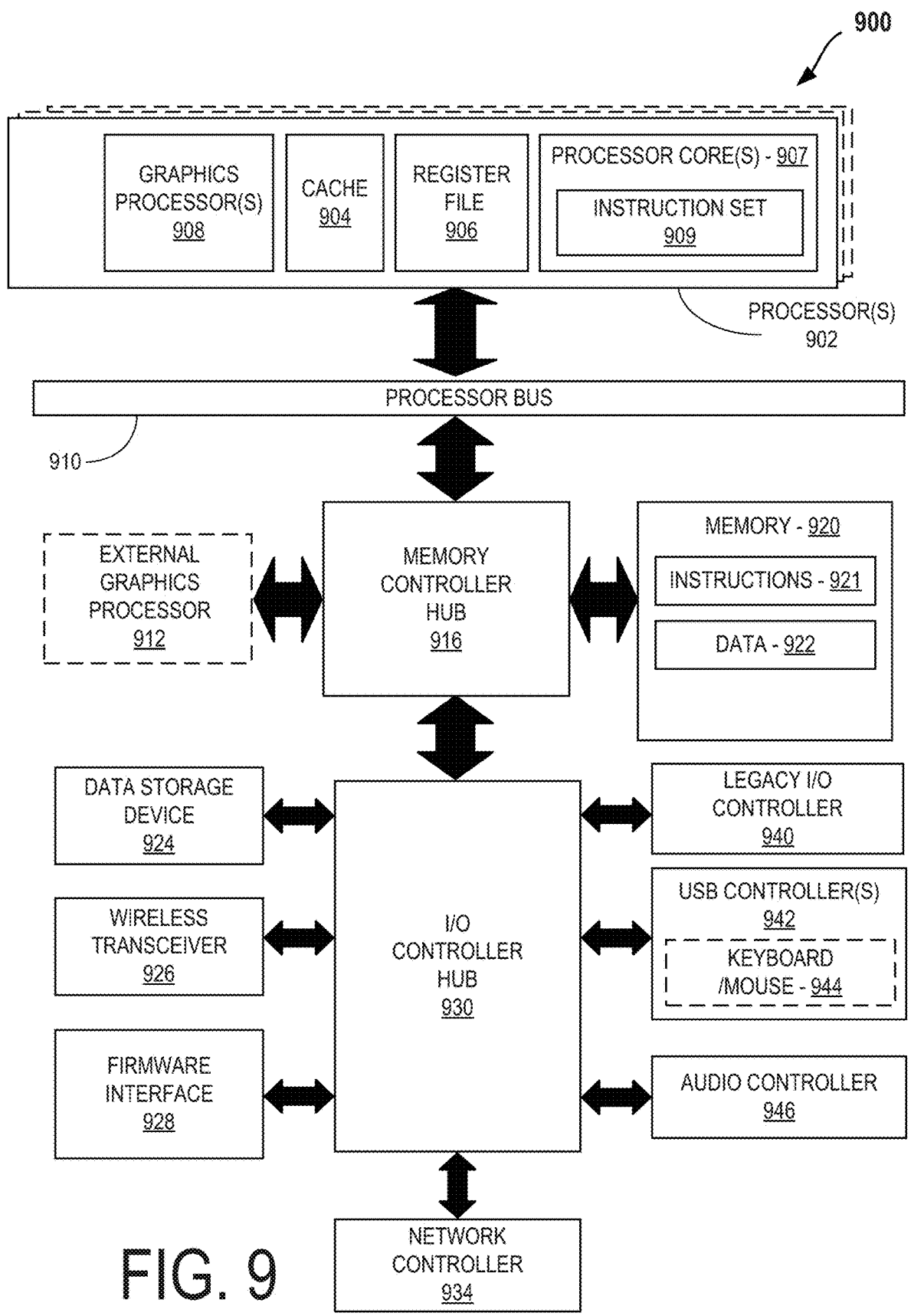
FIG. 9 illustrates a block diagram of an embodiment of a computing system, which may be utilized in various embodiments discussed herein.

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In an embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
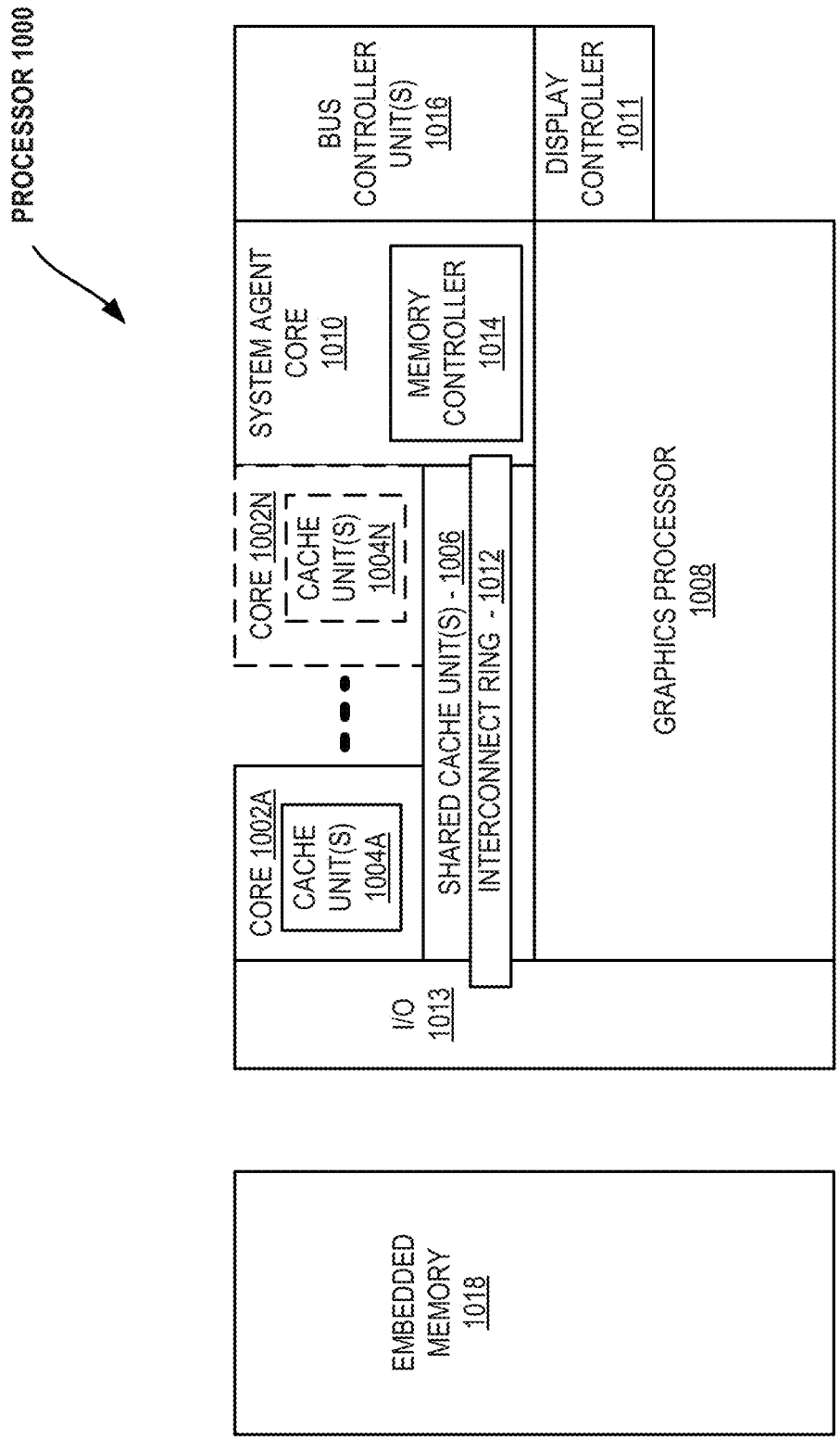
FIG. 10 illustrates various components of a processer in accordance with some embodiments.

FIG. 10 is a block diagram of an embodiment of a processor 1000 having one or more processor cores 1002A to 1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores up to and including additional core 1002N represented by the dashed lined boxes. Each of processor cores 1002A to 1002N includes one or more internal cache units 1004A to 1004N. In some embodiments each processor core also has access to one or more shared cached units 1006.

The internal cache units 1004A to 1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A to 1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A to 1002N include support for simultaneous multi-threading. In such embodiment, the system agent core 1010 includes components for coordinating and operating cores 1002A to 1002N during multi-threaded processing. System agent core 1010 may additionally include a power control unit (PCU), which includes logic and components to regulate the power state of processor cores 1002A to 1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring-based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM (or embedded DRAM) module. In some embodiments, each of the processor cores 1002 to 1002N and graphics processor 1008 use embedded memory modules 1018 as a shared Last Level Cache.

In some embodiments, processor cores 1002A to 1002N are homogenous cores executing the same instruction set architecture. In another embodiment, processor cores 1002A to 1002N are heterogeneous in terms of instruction set architecture (ISA), where one or more of processor cores 1002A to 1002N execute a first instruction set, while at least one of the other cores executes a subset of the first instruction set or a different instruction set. In one embodiment processor cores 1002A to 1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

The following examples pertain to further embodiments. Example 1 includes an apparatus comprising: a storage device to store data; and a processor, coupled to the storage device, to compute a tag update, based at least in part on the stored data, for an authentication operation, wherein the tag update is to be computed by replacing a 'for' loop with a carry-less multiply operation, wherein the processor is to compute an authentication tag based at least in part on the tag update. Example 2 includes the apparatus of example 1, wherein the processor is to compute the authentication tag based on one or more selected bits of a product of the carry-less multiply operation as the tag update. Example 3 includes the apparatus of example 1, wherein the processor is to compute the tag update based at least in part on a 64-bit keystream and a 32-bit message for a 4-byte tag, in response to a carry-less multiply instruction that accepts 64-bit operands.

Example 4 includes the apparatus of a example 1, wherein the processor is to compute the tag update based at least in part on a 128-bit keystream and a 64-bit message for an 8-byte tag, in response to a carry-less multiply instruction that accepts 64-bit operands. Example 5 includes the apparatus of a example 4, wherein the processor is to compute the tag update in response to four carry-less multiply instructions with 64-bit portions of the keystream and 32-bit portions of the message. Example 6 includes the apparatus of a example 1, wherein the processor is to compute the tag update based at least in part on a 256-bit keystream and a 128-bit message for a 16-byte tag, in response to a carry-less multiply instruction that accepts 64-bit operands. Example 7 includes the apparatus of a example 6, wherein the processor is to compute the tag update in response to sixteen carry-less multiply instructions with 64-bit portions of the keystream and 32-bit portions of the message. Example 8 includes the apparatus of example 1, wherein the processor comprises one or more processor cores.

Example 9 includes a method comprising: storing data in a storage device; and computing, at a processor, a tag update, based at least in part on the stored data, for an authentication operation, wherein the tag update is to be computed by replacing a 'for' loop with a carry-less multiply operation, wherein the processor computes an authentication tag based at least in part on the tag update. Example 10 includes the method of example 9, further comprising computing the authentication tag based on one or more selected bits of a product of the carry-less multiply operation as the tag update. Example 11 includes the method of example 9, further comprising computing the tag update based at least in part on a 64-bit keystream and a 32-bit message for a 4-byte tag, in response to a carry-less multiply instruction that accepts 64-bit operands.

Example 12 includes the method of example 9, further comprising computing the tag update based at least in part on a 128-bit keystream and a 64-bit message for an 8-byte tag, in response to a carry-less multiply instruction that accepts 64-bit operands. Example 13 includes the method of example 9, further comprising computing the tag update based at least in part on a 256-bit keystream and a 128-bit message for a 16-byte tag, in response to a carry-less multiply instruction that accepts 64-bit operands.

Example 14 includes one or more non-transitory computer-readable media comprising one or more instructions that when executed on a processor configure the processor to perform one or more operations to: store data in a storage device; and compute, a tag update, based at least in part on the stored data, for an authentication operation, wherein the tag update is to be computed by replacing a 'for' loop with a carry-less multiply operation, wherein the processor is to compute an authentication tag based at least in part on the tag update. Example 15 includes the one or more computer-readable media of example 14, further comprising one or more instructions that when executed on the processor configure the processor to perform one or more operations to cause computation of the authentication tag based on one or more selected bits of a product of the carry-less multiply operation as the tag update.

Example 16 includes the one or more computer-readable media of example 14, further comprising one or more instructions that when executed on the processor configure the processor to perform one or more operations to cause computation of the tag update based at least in part on a 64-bit keystream and a 32-bit message for a 4-byte tag, in response to a carry-less multiply instruction that accepts 64-bit operands. Example 17 includes the one or more computer-readable media of example 14, further comprising one or more instructions that when executed on the processor configure the processor to perform one or more operations to cause computation of the tag update based at least in part on a 128-bit keystream and a 64-bit message for an 8-byte tag, in response to a carry-less multiply instruction that accepts 64-bit operands.

Example 18 includes the one or more computer-readable media of example 17, further comprising one or more instructions that when executed on the processor configure the processor to perform one or more operations to cause computation of the tag update in response to four carry-less multiply instructions with 64-bit portions of the keystream and 32-bit portions of the message. Example 19 includes the one or more computer-readable media of example 14, further comprising one or more instructions that when executed on the processor configure the processor to perform one or more operations to cause computation of the tag update based at least in part on a 256-bit keystream and a 128-bit message for a 16-byte tag, in response to a carry-less multiply instruction that accepts 64-bit operands.

Example 20 includes the one or more computer-readable media of example 19, further comprising one or more instructions that when executed on the processor configure the processor to perform one or more operations to cause computation of the tag update in response to sixteen carry-less multiply instructions with 64-bit portions of the keystream and 32-bit portions of the message. Example 21 includes an apparatus comprising means to perform a method as set forth in any preceding example. Example Machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a storage device to store a message for an authentication operation and a keystream;
computer readable instructions; and
a processor, coupled to the storage device, to at least one of instantiate or execute the computer readable instructions to:
perform a carry-less multiply operation on a portion of the keystream and a portion of the message;
extract a subset of bits from a result of the carry-less multiply operation;
combine the subset of bits with a previously generated tag using an exclusive OR operation to generate a tag update; and
generate an authentication tag based at least in part on the tag update, the carry-less multiply operation to reduce resources used by the processor when executing the authentication operation.

2. The apparatus of claim 1, wherein the keystream is a 64-bit keystream, the message is a 32-bit message, and the processor is to generate a 4-byte tag update based on extracting 32 bits from the result of the carry-less multiply operation on the 64-bit keystream and the 32-bit message wherein the carry-less multiply operation accepts 64-bit operands.

3. The apparatus of claim 1, wherein the processor is to generate the tag update based at least in part on a 128-bit keystream and a 64-bit message for an 8-byte tag, wherein the carry-less multiply operation accepts 64-bit operands.

4. The apparatus of claim 3, wherein the processor is to generate the tag update in response to four carry-less multiply operations with 64-bit portions of the keystream and 32-bit portions of the message.

5. The apparatus of claim 1, wherein the processor is to generate the tag update based at least in part on a 256-bit keystream and a 128-bit message for a 16-byte tag, wherein the carry-less multiply operation accepts 64-bit operands.

6. The apparatus of claim 5, wherein the processor is to generate the tag update in response to sixteen carry-less multiply operations with 64-bit portions of the keystream and 32-bit portions of the message.

7. The apparatus of claim 1, wherein the processor comprises one or more processor cores to perform the authentication operation.

8. A method comprising:
obtaining, by executing an instruction with at least one processor, a message for an authentication operation and a keystream; and
performing, by executing an instruction with the at least one processor, a carry-less multiply operation on a portion of the keystream and a portion of the message;
selecting, by executing an instruction with the at least one processor, a subset of bits from a result of the carry-less multiply operation;
combining, by executing an instruction with the at least one processor, the subset of bits with a previously generated tag using an exclusive OR operation to generate a tag update; and
generating, by executing an instruction with the at least one processor, an authentication tag based at least in part on the tag update.

9. The method of claim 8, the keystream is a 64-bit keystream, the message is a 32-bit message, and further generating a 4-byte tag update based on extracting 32 bits from the result of the carry-less multiply operation on the 64-bit keystream and the 32-bit message, wherein the carry-less multiply operation accepts 64-bit operands.

10. The method of claim 8, further comprising generate the tag update based at least in part on a 128-bit keystream and a 64-bit message for an 8-byte tag, wherein the carry-less multiply operation accepts 64-bit operands.

11. The method of claim 8, further comprising generating the tag update based at least in part on a 256-bit keystream and a 128-bit message for a 16-byte tag, wherein the carry-less multiply operation accepts 64-bit operands.

12. One or more non-transitory computer-readable media comprising one or more instructions that, when executed cause a processor to at least:
obtain a message for an authentication operation and a keystream; and
perform a carry-less multiply operation on a portion of the keystream and a portion of the message;
select a subset of bits from a result of the carry-less multiply operation;
combine the subset of bits with a previously generated tag using an exclusive OR operation to generate a tag update; and
generate an authentication tag based at least in part on the tag update.

13. The one or more computer-readable media of claim 12, wherein the keystream is a 64-bit keystream, the message is a 32-bit message, and the or more instructions that, when executed on the processor, configure the processor to perform one or more operations to generate a 4-byte tag update based on extracting 32 bits from the result of the carry-less multiply operation on the 64-bit keystream and the 32-bit message, wherein the carry-less multiply operation accepts 64-bit operands.

14. The one or more computer-readable media of claim 12, further comprising one or more instructions that, when executed on the processor, configure the processor to perform one or more operations to generate the tag update based at least in part on a 128-bit keystream and a 64-bit message for an 8-byte tag, wherein the carry-less multiply operation accepts 64-bit operands.

15. The one or more computer-readable media of claim 14, further comprising one or more instructions that, when executed on the processor, configure the processor to perform one or more operations to generate the tag update in response to four carry-less multiply operations with 64-bit portions of the keystream and 32-bit portions of the message.

16. The one or more computer-readable media of claim 12, further comprising one or more instructions that, when executed on the processor, configure the processor to perform one or more operations to generate the tag update based at least in part on a 256-bit keystream and a 128-bit message for a 16-byte tag, wherein the carry-less multiply operation accepts 64-bit operands.

17. The one or more computer-readable media of claim 16, further comprising one or more instructions that, when executed on the processor, configure the processor to perform one or more operations to generate the tag update in response to sixteen carry-less multiply operations with 64-bit portions of the keystream and 32-bit portions of the message.

\* \* \* \* \*